United States Patent [19]

Holland et al.

[11] 4,253,422
[45] Mar. 3, 1981

[54] CAGE REINFORCEMENT SYSTEM

[75] Inventors: Eddie L. Holland, Roswell; Charles A. White, Woodstock, both of Ga.

[73] Assignee: U.S. Industries, Inc., New York, N.Y.

[21] Appl. No.: 114,220

[22] Filed: Jan. 22, 1980

[51] Int. Cl.³ ............................................. A01K 31/06
[52] U.S. Cl. ......................................... 119/17; 119/48
[58] Field of Search ..................... 119/17, 18, 22, 48

[56] References Cited
U.S. PATENT DOCUMENTS 4,212,269   7/1980   White et al. ........................... 119/17

Primary Examiner—Jay N. Eskovitz
Attorney, Agent, or Firm—Price, Heneveld, Huizenga & Cooper

[57] ABSTRACT

A reinforcement member for use in conjunction with multi-tiered layer cage assemblies. The member is fitted between the diverging back walls of the uppermost rows of cages. It is formed from a metal channel having tabs formed in its ends, the tabs receiving individual wires forming the cage back walls.

2 Claims, 4 Drawing Figures

CAGE REINFORCEMENT SYSTEM

BACKGROUND OF THE INVENTION

This invention relates to multi-tier cage assemblies and, more particularly, to multi-tier cage assemblies such as shown and described in U.S. Pat. Application Ser. No. 871,821, filed, Jan. 24, 1978, in the name of White et al, the same being commonly assigned with the present application.

The aforenoted application, more specifically, discloses a cage assembly wherein a plurality of vertically spaced, elongated wire mesh cage rows are mounted on opposite sides of and extend between a pair of A-frames. The floors of the individual cages are slanted downwardly and outwardly to permit the egress of eggs from the cage onto suitable collection means. The uppermost cage rows function, in addition to confining layers and supporting the necessary egg collection and feed equipment, to vertically stabilize the rows of cages therebelow by means of support wires extending between and interconnected to the vertically displaced cage rows.

The system of the aforenoted application depends to great extent on the abutment and/or interconnection of the rear floor or back sections of the uppermost cage rows for structural stability. Although such abutment and interconnection provides an important amount of stability, a tendency has been noted for the cages in these rows to rotate in the field, the rear sections rotating downwardly and the faces upwardly. This tendency results, as will be readily appreciated by those skilled in the art, in a reduction of the floor inclination, retarding in many cases, if not stopping altogether, the egress of eggs from the cages onto the collection belt. Such a situation, of course, quickly becomes intolerable, and people have gone to great lengths by means of complicated and extensive systems of truss rods, etc., to reestablish the proper floor slope.

The present invention discloses and claims a simple and inexpensive mechanism for remedying the aforenoted tendency. It can be easily installed in existing cage systems, as well as incorporated into new installations.

SUMMARY OF THE INVENTION

The present invention is for use in egg-layer cage assemblies having a plurality of vertically spaced, elongated wire mesh cage rows mounted on opposite sides of and extending between a pair of frames having upwardly, inwardly extending legs. The floors of the cages slant downwardly and outwardly to openings along the opposed fronts thereof to permit the egress of eggs therefrom.

The uppermost of the rows vertically stabilize the rows therebelow intermediate the frames by means of support wires extending between and interconnected to the vertically displaced cage rows. The uppermost of the rows have the interior, bottom back walls thereof in contact with one another, the back walls diverging upwardly from this area of contact.

The improvement which is the subject of the present invention comprises stabilizing struts positioned intermediate of said frames and extending between said upper rows of cages, the struts comprising rigid members having means on the working extremities thereof to receive and retain parts of the wire mesh back walls of the upper rows of cages. The members are received and compressed between parts of the back walls near the upper extremities thereof to prevent such upper extremities from converging toward one another under the load placed on said upper rows by the birds contained therein and the force exerted by the support wires from the cage rows therebelow. The struts prevent rotation of the cage rows and the consequent lessening of the slant of the cage floors.

DETAILED DESCRIPTION OF THE PREFERRED EMBODIMENT

The present invention, as previously noted, relates to cage assemblies such as disclosed in U.S. Pat. Application Ser. No. 871,821, filed Jan. 24, 1978, in the name of White et al, and entitled Poultry Cages. The specification and drawings of this application teach in detail the manner in which the uppermost rows of a multi-tiered cage assembly may be utilized to stabilize the cage rows therebelow and are specifically incorporated by reference herein.

Figure 1:
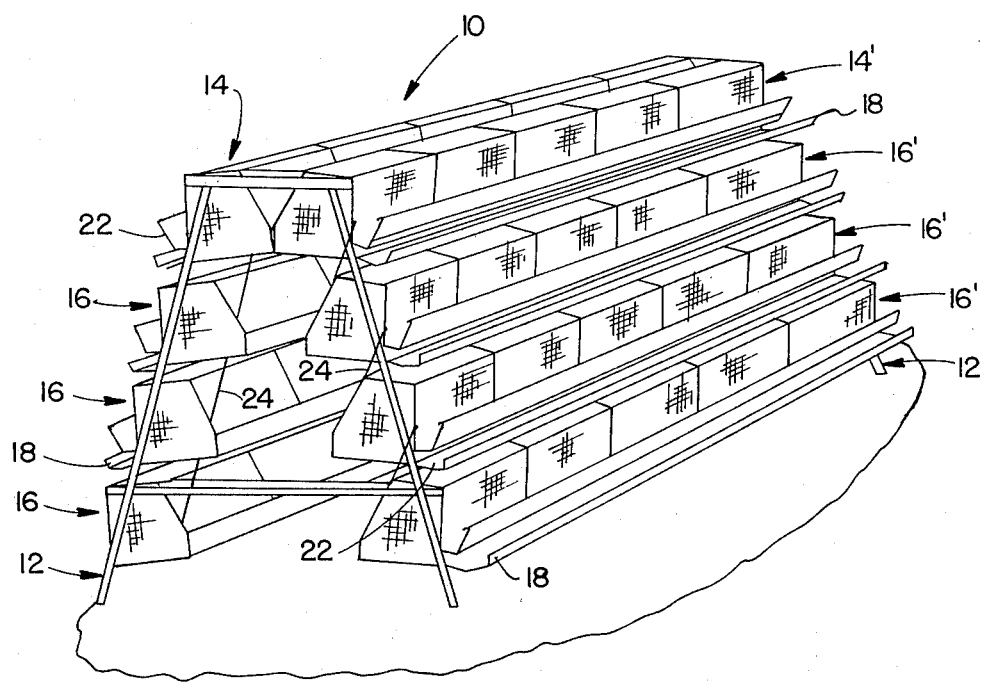
FIG. 1 is a perspective view of a prior art cage system to which the present invention is applicable.
Figure 3:
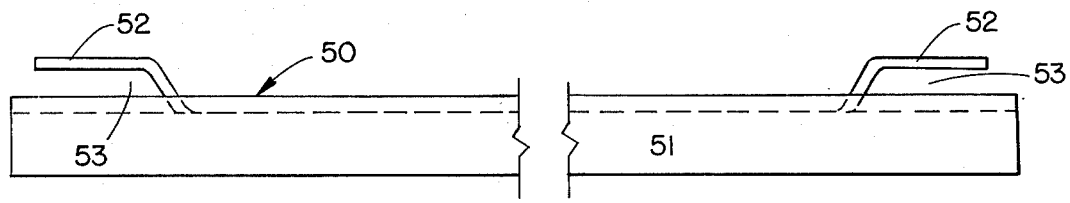
FIG. 3 is a fragmentary, side elevation of the strut.
Figure 4:
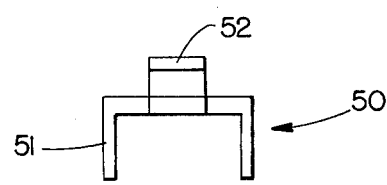
FIG. 4 is an end elevation of the strut.

The assembly 10 to which the instant invention is applicable, as illustrated in FIG. 1, comprises briefly a series of spaced, A-frame support assemblies having upper cage rows 14 and 14' and multi-tiered, lower cage rows 16 and 16' suspended therebelow in outwardly and downwardly, diverging fashion. The floors of the cages 14, 14', 16 and 16' are slanted downwardly and outwardly and open onto egg collection belts 18. The individual cage rows also support feed troughs 22. A series of wires or hangers 24 interconnect each set of cage rows with that thereabove, all as described in detail in the aforenoted application.

Figure 2:
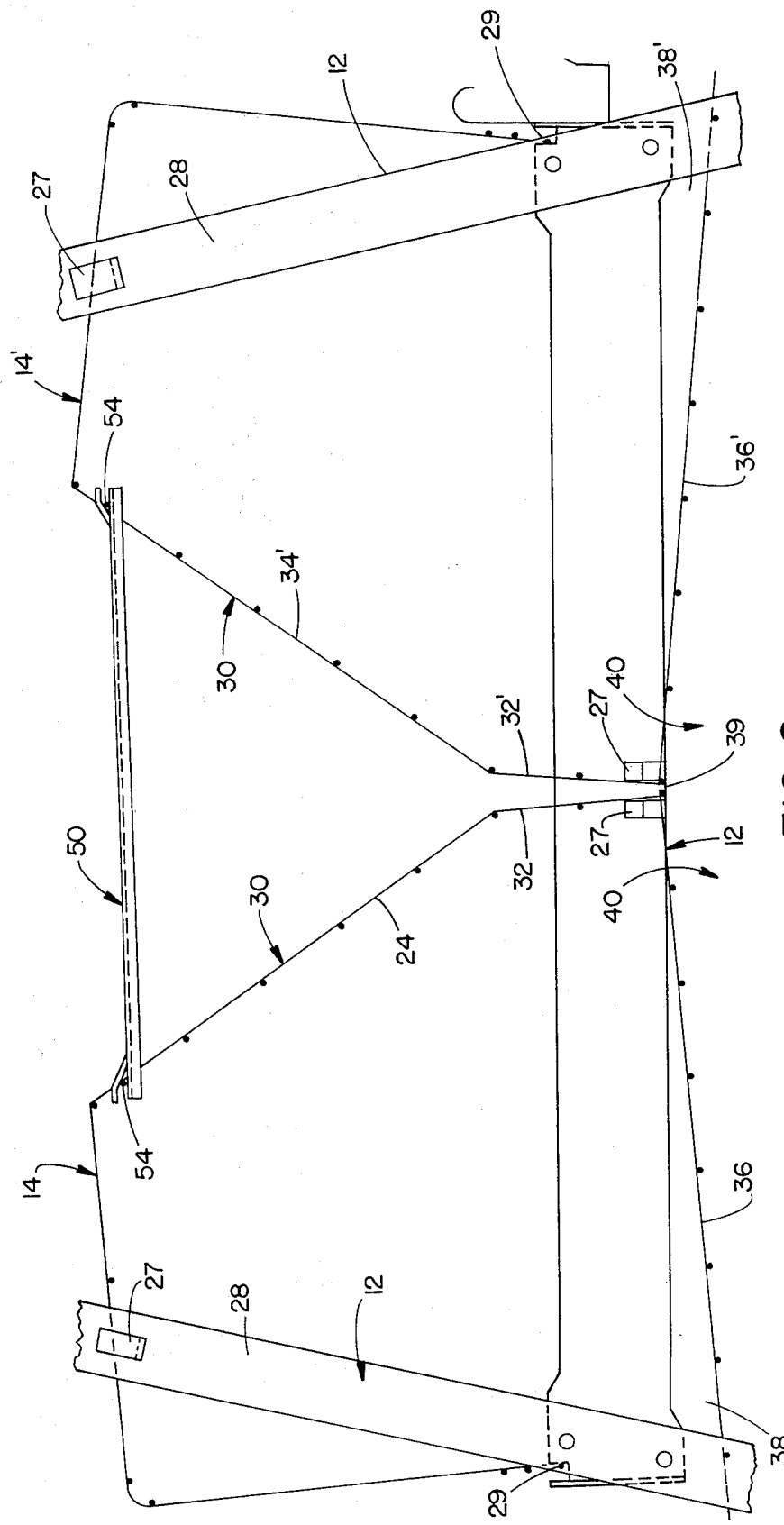
FIG. 2 is a schematic, end elevation illustrating the configuration of the uppermost cage rows with the strut which is the subject of this invention affixed therebetween.

The individual cage rows are affixed to the A-frame supports 12 by means of hangers 26, the hangers consisting merely of lanced or punched L-shape members opening upwardly at various locations on the support frame 12. FIG. 2, for example, illustrates a three-point suspension for each of the uppermost cage rows, one being on the horizontal cross member 27, another on the slanted, A-frame side 28 and the third on the extremity of cross piece 29. This suspension system, illustrated schematically in FIG. 2, while not precisely identical to that illustrated in the aforereferenced application, will be readily understood with reference to that application.

The uppermost cage rows, as illustrated specifically in FIG. 2, include back walls 30 and 30' having generally vertical sections 32 and 32' and outwardly diverging sections 34 and 34'. The floors 36 and 36' are sloped downwardly and outwardly at approximately a seven degree angle, openings 38 and 38' being provided on the faces of the cages to permit eggs to egress onto the collection belts in conventional fashion.

The back walls 32 and 32' of the cages, as noted in detail in the referenced application, abut one another and are preferably affixed together at the floor-back wall intersection 39. This abutment functions to stabilize the cage assembly. A tendency exists, nevertheless, for the uppermost cage rows 14 and 14', illustrated in FIG. 2, to rotate downwardly and inwardly under influence of the loads placed thereon, not only by the poultry and equipment suspended directly therefrom but by the stabilizing struts 24 which interconnect the vertically displaced cage rows. Such rotation, as will be readily apparent to those skilled in the art, results in a leveling of the cage floors 36 and 36', such leveling interfering significantly with the gravitational ejection of eggs from the cage onto the collection mechanisms 18.

It has been discovered that the aforenoted, undesirable rotation of the cage rows in the direction 40 can be substantially reduced and in many cases completely eliminated by installation of struts 50 between the upper sections of the cage back walls in the general position illustrated in FIG. 2. Strut 50 comprises, simply, a metal channel 51 having tabs 52 formed at either extremity thereof. The tabs 52, in conjunction with the remaining top and sidewalls of the channel 51, for a pocket 53 adapted to receive one of the longitudinal cage wires 54 on each of the uppermost rows of cages. The strut is positioned at or near the top of the back walls and is sized so as to preferably be in minor compression prior to loading of the cages. As the cages are loaded and forces exerted on upper rows 14 and 14', tending to rotate the same in the direction 40, this compression increases substantially, preventing movement of the facing upper back portions of the cages 14 and 14' toward one another. Prevention of this movement effectively prohibits rotation of the cages in the direction 40. The cage floors, thus, remain slanted at the proper angle and the egg collection process can proceed automatically as intended.

The strut which is the subject of the instant invention can be easily fabricated and installed on existing cage assemblies or new installations. Several, ordinarily, will be utilized between each set of supports 12, the same being positioned, preferably, at or near the lateral partitions which divide the cage rows into individual cages for added stability. It is necessary, in the system illustrated, to utilize the struts only between the uppermost cage rows 14 and 14'.

While a preferred embodiment of this invention has been illustrated in detail, it will be readily apparent to those skilled in the art that other embodiments may be conceived and fabricated without departing from the spirit and scope of this invention. Such embodiments are to be deemed included in the appended claims, unless the claims, by their language, expressly state otherwise.

The embodiments of the invention in which an exclusive property or privilege is claimed are defined as follows:

1. In an egg-layer cage assembly comprising a plurality of vertically spaced, elongated wire mesh cage rows mounted on opposite sides of and extending between a pair of frames having upwardly, inwardly extending legs, said cages having floors which slant downwardly and outwardly to openings along the opposed fronts thereof to permit the egress of eggs therefrom, the uppermost of said rows vertically stabilizing the rows therebelow intermediate said frames by means of support wires extending between and interconnected to the vertically displaced cage rows, the uppermost of said rows having the interior bottom back walls thereof in contact with one another, said back walls diverging upwardly, the improvement comprising stabilizing struts positioned intermediate of said frames and extending between said upper rows of cages, said stabilizing struts comprising rigid members having means on the working extremities thereof to receive and retain parts of the wire mesh back walls of said upper rows of cages, said members receiving and being compressed between parts of said back walls near the upper extremities thereof to prevent such upper extremities from converging toward one another under the load placed on said upper rows from the birds contained therein and the force exerted by said support wires from the cage rows therebelow, thereby preventing rotation of said cage rows and the consequent lessening of the slant of the cage floors.

2. The improvement set forth in claim 1 wherein said struts comprise elongated members having means on the extremities thereof to receive one or more of the wires of said mesh cages.

* * * * *